United States Patent
Nishimura et al.

[11] Patent Number: 5,756,886
[45] Date of Patent: May 26, 1998

[54] TOUCH PROBE WITH RESEAT POSITION SYSTEM

[75] Inventors: Kunitoshi Nishimura; Kazuhiko Hidaka, both of Ibaraki, Japan

[73] Assignee: Mitutoyo Corporation, Kanagawa, Japan

[21] Appl. No.: 725,214

[22] Filed: Sep. 25, 1996

[30] Foreign Application Priority Data

Sep. 25, 1995 [JP] Japan ................... 7-246066

[51] Int. Cl.$^6$ ........................ G01B 7/00
[52] U.S. Cl. ............... 73/105; 33/558; 33/561
[58] Field of Search .............. 73/104, 105; 33/501, 33/503, 504, 556, 558, 561

[56] References Cited

U.S. PATENT DOCUMENTS

| | | |
|---|---|---|
| 4,153,998 | 5/1979 | McMurtry . |
| 4,177,568 | 12/1979 | Werner et al. ............... 33/561 |
| 4,702,013 | 10/1987 | McMurtry ................... 33/558 |
| 4,763,421 | 8/1988 | Eichtinger ................... 33/561 |
| 4,769,919 | 9/1988 | Lloyd et al. ................. 33/558 |
| 4,916,825 | 4/1990 | Breyer ........................ 33/561 |
| 5,018,280 | 5/1991 | Enderle et al. . |
| 5,319,858 | 6/1994 | Coy ............................ 33/561 |

FOREIGN PATENT DOCUMENTS 1647223  5/1991  U.S.S.R. ................... 33/561

*Primary Examiner*—Hezron E. Williams
*Assistant Examiner*—Daniel S. Larkin
*Attorney, Agent, or Firm*—Webb Ziesenheim Bruening Logsdon Orkin & Hanson, P.C.

[57] ABSTRACT

A touch probe which includes a fixed member, a movable member, a stylus, a bias means, and a reseat position system which permits the fixed member and the movable member to make contact with each other at pairs of contact points at positions which are spaced from one another. In the reseat position system, piezoelectric elements are provided which cause the fixed member and the movable member to move relatively in directions constrained by said pairs of contact points after a force applied to the movable member is removed. This realizes a touch probe which can secure high position reproducibility for a long period of time even if frictional forces act between the fixed member and the movable member.

17 Claims, 21 Drawing Sheets

PRIOR ART

PRIOR ART

TOUCH PROBE WITH RESEAT POSITION SYSTEM

BACKGROUND OF THE INVENTION

1. Field of the Invention

The present invention relates to improvements in a touch probe including a fixed member, a movable member, and a reseat position system for allowing the movable member to be displaced relative to the fixed member when a force is externally applied to the movable member and for returning the movable member from which the force is eliminated to a rest position. This type of probe is used in a three-dimensional coordinate measuring machine or the like.

2. Description of the Related Art

In a three-dimensional coordinate measuring machine, a contact element of a three-dimensionally movable probe is brought into contact with a workpiece placed on a fixed (granite) table, the occasion of contact of the contact element with the workpiece is used to cause an electrical trigger to read the values of the three-dimensional feeds in terms of coordinate values along the three axes. The size and shape of the workpiece are measured on the basis of these coordinate values. Since the probe is used to detect a contact state with the workpiece and to generate an electrical touch signal, it is called a touch probe and is widely used.

Generally, the touch probe includes a detection system for detecting a slight movement of a stylus having a contact element when it contacts a workpiece, and a safety system for preventing damage to the probe from a substantial movement of the stylus.

The safety system provides a relief function for permitting substantial movement in the stylus relative to the housing of the probe, and a reseat (recovering) function for returning the stylus to the original position after its relief action is required. A system having these two functions is called a reseat position system. The reseat position system provides a function for locating the stylus at a fixed position, and directly affects measurement repeatability.

A six-point contact reseat position system has been known as a reseat position system satisfying these two functions. FIG. 1 illustrates an overall construction of a touch trigger probe having the six-point contact reseat position system. Referring to FIG. 1, a stylus 1 is fixed to a movable member 2. Three posts 3 are radially projected from the movable member 2 at 120° spacing about the axial line of the stylus 1 and within a plane perpendicular to the axial line of the stylus 1. Three sets of V-shaped locking portions 6 formed by combining two posts are fixed to a fixed member mounted to a probe housing 4 (a bottom wall of the probe housing 5) at positions corresponding to the posts 3 of the movable member 2.

In the construction as described above, when the movable member 2 is pressed by a spring 7 serving as a bias means to the fixed member 5, the movable member rests at a specified position. At this time, each post 3 on the movable member 2 comes into contact with the corresponding V-shaped locking portion 6 at two points, i.e., at six points in total. Thus, the system is called a six-point contact relief system or a six-point contact reseat position system. In addition, the position on which the movable member 2 rests is called a rest position or a seated position.

Although the combination of the post 3 with the V-shaped locking portions is shown in FIG. 1, the similar function can be offered even by the combination of the posts 3 and hard balls 8 shown in FIG. 2, or by the combination of hard balls 9 and V-shaped grooves 10 shown in FIG. 3. Referring to FIG. 3, the posts 3 are combined with the V-shaped grooves 10. However, the hard balls 9 are provided under the posts 3.

The combination of the posts, the combination of the post with the hard balls, and the combination of the hard balls with the V-shaped groove form a pair of contact points, and allow relative displacement of the fixed member and the movable member while maintaining the contact at these contact points. The displacement allowable is, for example, in the direction of the V-shaped groove in the case of the combination of the hard ball and the V-shaped groove, and the axial direction of the post in the case of the combination of the post and the hard balls.

FIG. 4 is a partially enlarged view of the reseat position system shown in FIG. 3. Referring to FIG. 4, a movement of the hard ball 9 along the first direction side-to-side of the groove is prevented, and the movement of the hard ball 9 along the second direction upwardly out of the groove is prevented by a pressing force applied on the hard ball 9. Therefore, the hard ball 9 is allowed to move only along the third direction, that is, the direction of the groove. The first, second, and third directions are perpendicular to one another.

Also, in the case of the combination of the posts and in the case of the combination of the post and the hard ball, it can be understood that the contact surfaces at the contact points of two components define the displacement allowable direction or displacement allowable surface. Some techniques are used so as not to generate plastic deformation or wear when the posts 3 and the hard balls 8, 9 repeatedly come into contact with each other. Such techniques include the use of cemented carbide, etc., to fabricate the posts 3 and the hard balls 8 and 9.

It would appear that the reseat position system as described above offers ideal position reproducibility because a stable position of the movable member is directly and exclusively determined. However, the ideal position reproducibility can be offered only when frictional force acting on the contact points is zero. Actually, there is a problem that the position reproducibility deteriorates due to the frictional force.

The reason why variations in the seated position of the movable member arise will now be examined with reference to the combination of the hard ball 9 and the V-shaped groove 10. Each component of the reseat position system seems to be rigid because it is made of a metal block, but a portion near the contact points can be represented as a combination of various springs when it is observed precisely. That is, both components can move relatively. No matter how the portion near the contact points may be elastically deformed, the seated position must be directly and exclusively determined and the position reproducibility must be considerably high when a constant pressing force is applied to the portion. Actually, however, since frictional forces act on the contact points, the force of the hard ball 9 pressing a wall surface of the V-shaped groove 10 is not fixed even if the pressing force is constant. That is, when the hard ball 9 is seated or rests on the V-shaped groove 10, the frictional forces act in various directions, and hence the magnitude of the forces acting between the hard ball and the wall surfaces of the V-shaped groove differs variously so that the position reproducibility is deteriorated. The direction of the frictional forces is determined by a direction of relative slide between the hard ball and the V-shaped groove. Thus, when a force is applied to the stylus in various directions during a probing operation, the seated position varies considerably. This phenomenon is actually confirmed in many devices.

Various types of lubricants have been devised, i.e., various efforts have been made to reduce frictional forces. However, there is a problem with long-time stability due to deterioration of the lubricant.

In addition, as disclosed in U.S. Pat. No. 5,018,280, the fixed member and the movable member are devised to vibrate relatively so as to increase the position reproducibility (Dither Effect). However, since "to vibrate" means "to move repeatedly", a certain period of time is required and thereby causes wear and deterioration of the contact portions. In the case of the reseat position system shown in FIGS. 1 to 3, it is difficult to apply such a device thereto since coarseness of the contact portions seriously affects the position reproducibility. Further, in order to obtain the Dither Effect, it is necessary to select frequencies and amplitudes. Proper selection of the frequencies and amplitudes is required to exhibit the effect. However, when an environmental condition is changed, such as a change of a coefficient of friction is changed, it is necessary to readjust the frequencies and amplitudes. Therefore, a high position reproducibility for a long period of time cannot be secured.

SUMMARY OF THE INVENTION

It is an object of the present invention to provide a touch probe including a reseat position system which can secure high position reproducibility for a long period of time even if frictional forces act on a contacting portion between a fixed member and a movable member.

Generally, when the movable member is in contact with the fixed member at a specified position so as to be seated or rested, there are various directions of frictional forces at contact points, and hence the magnitude of the forces acting on each of the contact points differs variously so that the seated position varies.

The present invention is intended to increase reproducibility of a return position not by reducing the magnitude of a frictional force acting on each contact point, but by aligning the direction of the frictional force to one direction.

More specifically, according to one aspect of the present invention, there is provided a touch probe which comprises: a fixed member mounted to a housing; a movable member; a reseat position system which permits the fixed member and the movable member to make contact with each other at a pair of contact points at each of three positions which are spaced from one another so as to determine directly and exclusively the relative position between the fixed member and the movable member (in other words, to constrain the relative position of the fixed and movable members along a path in a fixed direction); a stylus mounted to the movable member and having a contact element at the distal end thereof which comes into contact with a workpiece; a bias means for allowing the movable member to be displaced relative to the fixed member when a force is externally applied to the contact element and for returning the movable member to a rest position when the force applied to the contact element is eliminated; and a displacement system which, when operating, causes a relative displacement between the fixed member and the movable member at each of contact points always in a fixed direction following specified procedures while maintaining a contacting state of the fixed member and the movable member in the reseat position system after the contact element is relieved from the force.

With the construction as described above, after the force acting on the stylus is eliminated and the movable member is substantially seated on the specified rest position due to the biasing force, the direction of the frictional forces at the contacting portions, the magnitude of which is determined in accordance with a component force of the biasing force at the contacting portions and the coefficient of friction at the contacting portions, is aligned to a specified direction. Consequently, it becomes possible to return the movable member to the rest position exactly.

In addition, unlike U.S. Pat. No. 5,018,280, the fixed member and the movable member are not relatively vibrated in the present invention. Thus, there is caused less friction and deterioration of the contact portions so that high position reproducibility can be secured for a long period of time.

Further, the displacement system according to the present invention may employ a plurality of piezoelectric magnetostrictive elements so as to make the direction of relative displacement between the fixed member and the movable member at each contact point into a plurality of different directions, and further, to make these directions into radial directions about the axis of the stylus.

DESCRIPTION OF THE PREFERRED EMBODIMENTS

Figure 1:
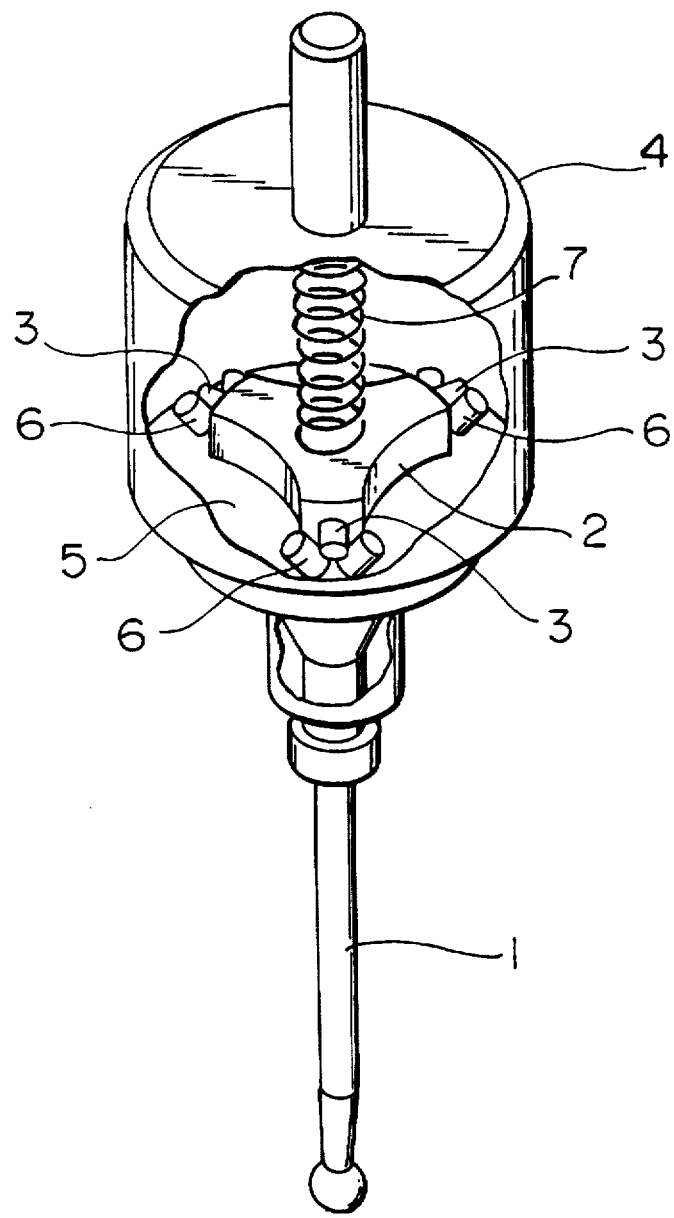
FIG. 1 is a schematic illustration showing a structure of a conventional touch trigger probe having a six-point contact reseat position system.
Figure 2:
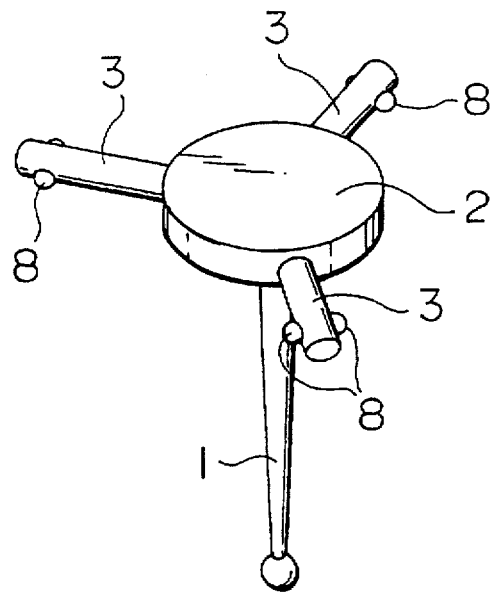
FIG. 2 is a schematic illustration showing each of the components of a reseat position system constructed by a combination of posts and hard balls.
Figure 3:
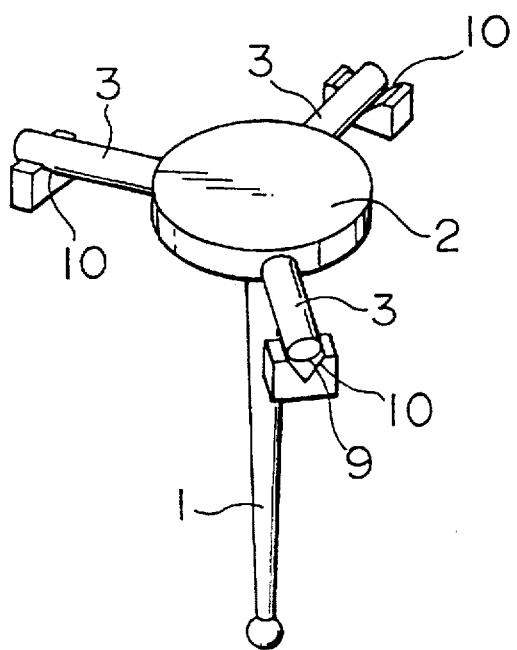
FIG. 3 is a schematic illustration showing each of the components of a reseat position system constructed by a combination of hard balls and V-shaped grooves.
Figure 4:
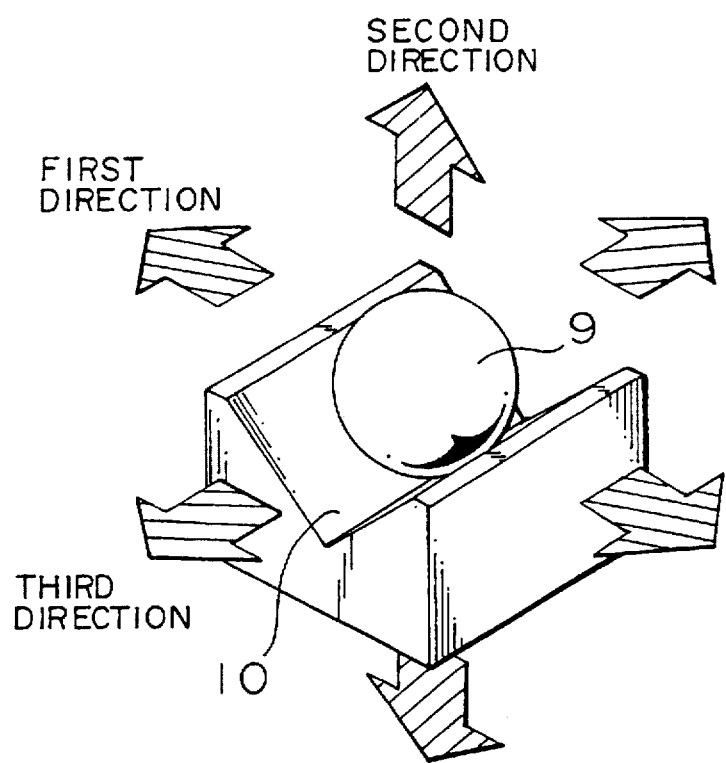
FIG. 4 is a view for explaining displaceable directions in the combination of the hard ball and the V-shaped groove.
Figure 5:
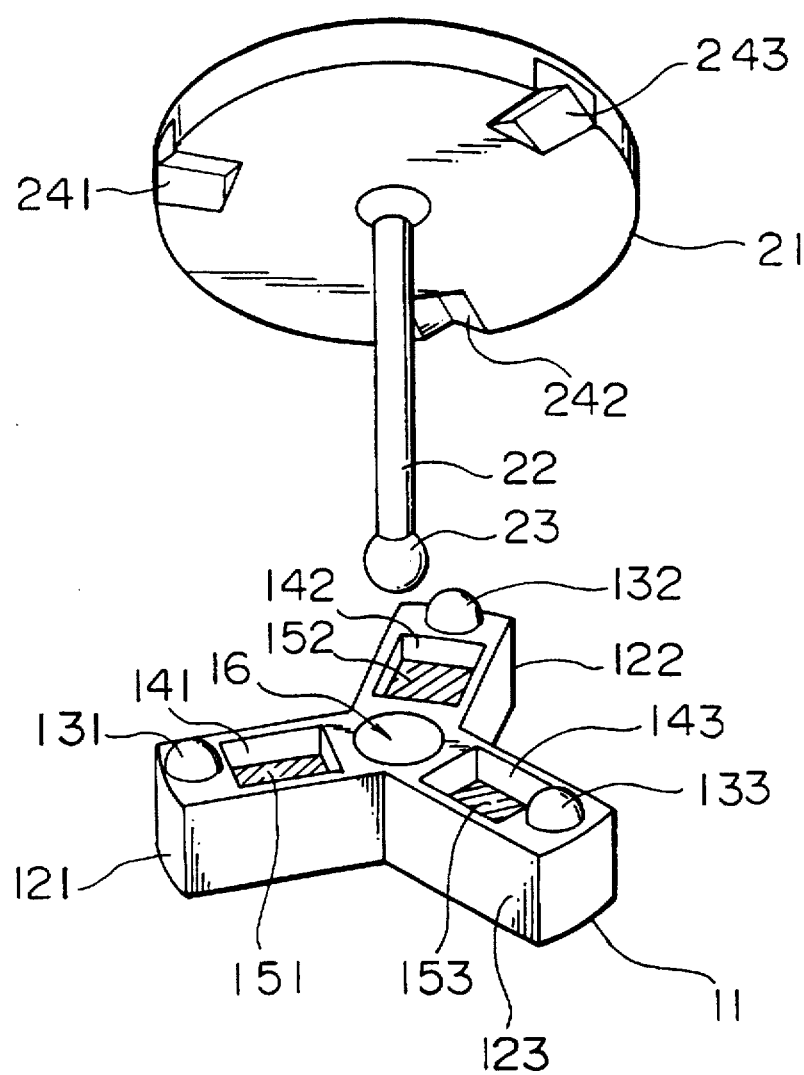
FIG. 5 is an exploded perspective view of a touch probe according to a first embodiment of the present invention.

FIG. 5 is an exploded perspective view of a touch probe which has a reseat position system using piezoelectric elements according to a first embodiment of the present invention. The reseat position system includes a fixed member 11, a movable member 21, and a bias means (this is not shown but is the same as the biasing spring 7 shown in FIG. 1) for allowing the movable member 21 to be displaced relative to the fixed member when a force is externally applied to the movable member 21 and for returning the movable member 21 when the force is eliminated to a rest position.

The fixed member 11 is fixed at its center portion to a housing of the probe, and has three arms 121 to 123 radially extending at 120° spacing about an axis of a stylus 22. Hard balls 131 to 133 are disposed on the upper surfaces of the tip ends of the arms 121 to 123, respectively. The center positions of the hard balls are at equal distances from the axis of the stylus 22 and spaced at 120°. In the arms 121 to 123, receptacle through holes 141 to 143 are formed along side of the hard balls 131 to 133 so as to open both in the upper and lower surfaces of the arms, and piezoelectric elements 151 to 153, which are actuating elements for a displacement system, are embedded in the receptacle through holes, respectively, in a preloaded condition The piezoelectric elements 151 to 153 are so disposed as to expand and contract along the radial direction. Therefore, when a voltage is applied to the piezoelectric elements 151 to 153, the hard balls 131 to 133 are radially displaced about the axis of the stylus 22. An aperture 16 is positioned in the center of the fixed member 11, and the stylus 22 of the movable member 21 is inserted therethrough. The stylus 22 is projected squarely and downwardly from the center of the movable member 21. A spherical contact element 23 for contacting a workpiece is provided at the lower end portion of the stylus 22. V-shaped grooves 241 to 243 are provided in the movable member 21 at three points which are each located 120° apart from one another. The V-shaped grooves 241 to 243 are disposed so that the directions thereof substantially coincide with the radial direction.

In the construction as described above, the movable member 21 is seated on the fixed member 11. In this condition, the hard balls 131 to 133 are received in the corresponding V-shaped grooves 241 to 243 and each hard ball comes into contact with the corresponding V-shaped groove at two points, i.e., at six points in total, so that the movable member 21 rests on the fixed member 11.

Figure 6:
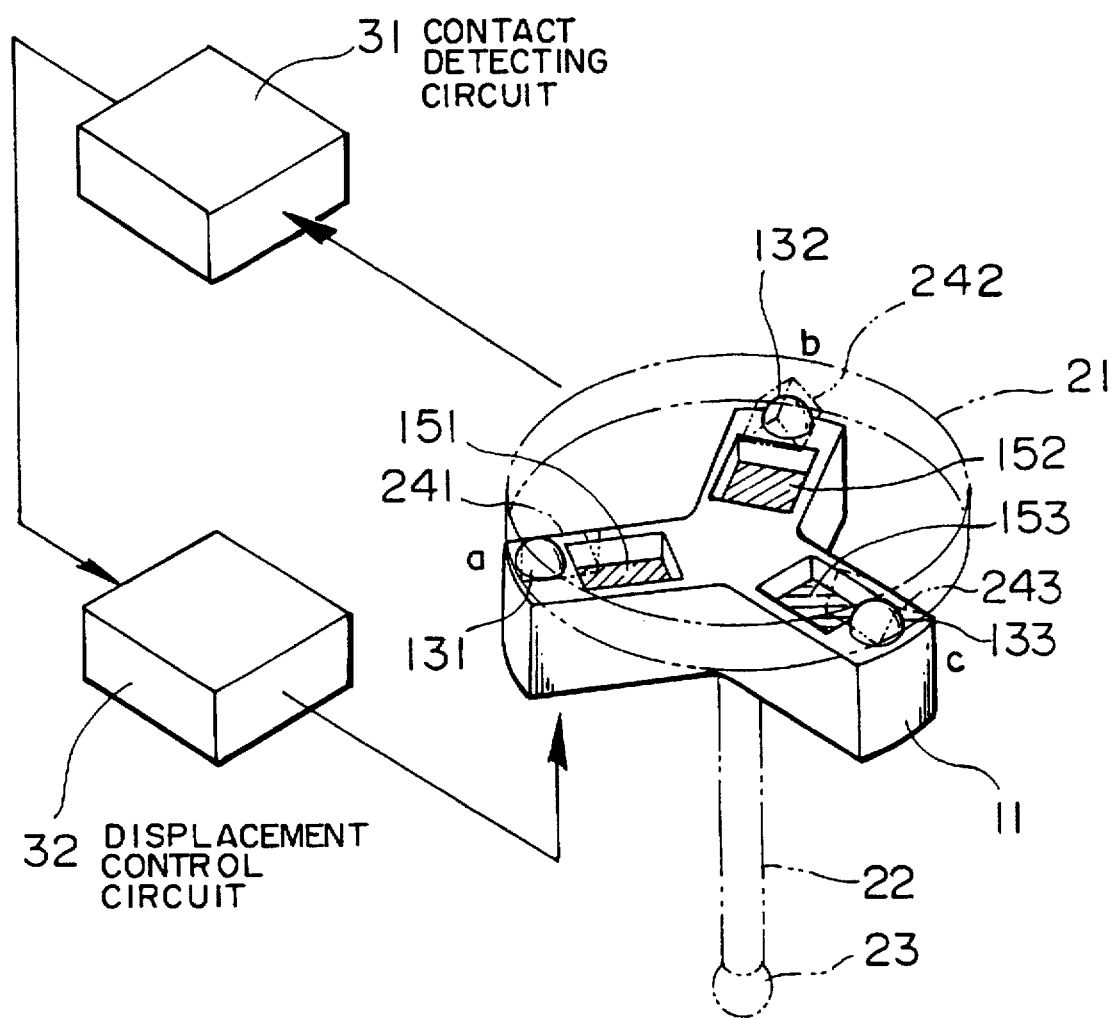
FIG. 6 is a block diagram showing a circuit system employed in the touch probe of the first embodiment.

FIG. 6 is a block diagram showing a circuit system of this embodiment. The circuit in this embodiment consists of a contact detecting circuit 31 for detecting displacement of the movable member 21 caused by the contact of the contact element 23 with the workpiece and for outputting a touch signal, and a displacement control circuit 32 for applying a specified voltage to the piezoelectric elements 151 to 153 within a time referenced to the touch signal. Therefore, when the displacement of the movable member 21 is detected by the contact detecting circuit 31, the touch signal is outputted, and the displacement control circuit 32 receives the signal and applies the specified voltage to the piezoelectric elements 151 to 153 at a proper time.

Figure 7A:
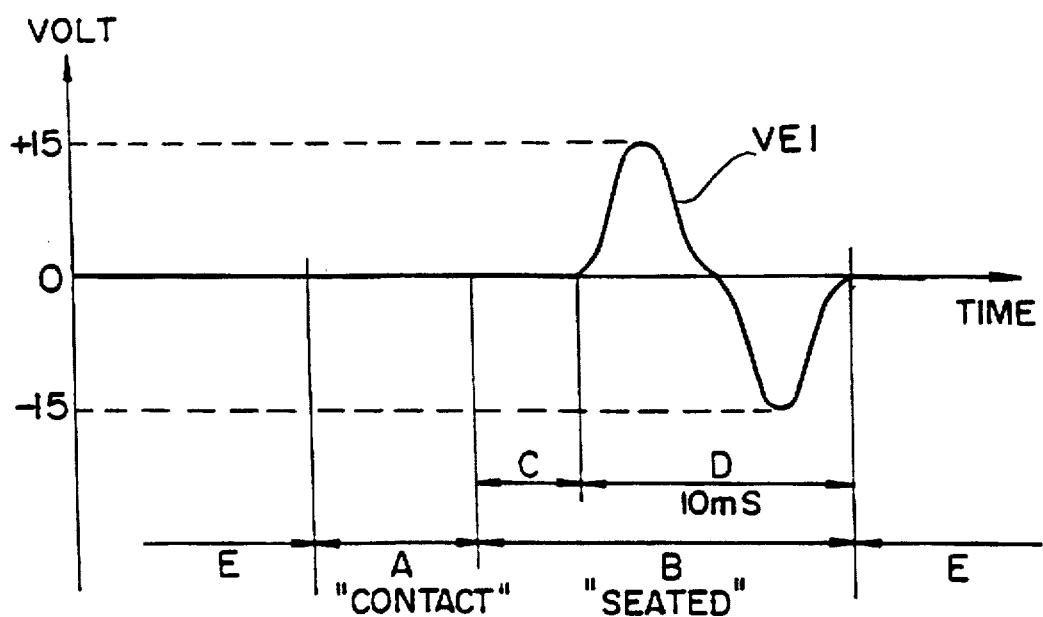
FIG. 7A illustrates waveforms corresponding to a series of probing operations in the touch probe of the first embodiment.
Figure 7B:
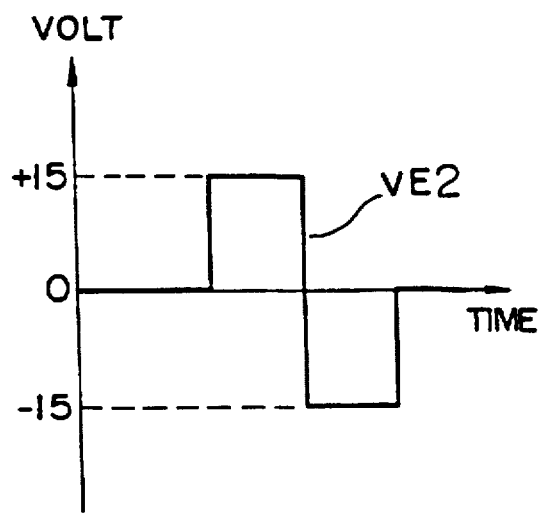
FIGS. 7B and 7C illustrate other voltage waveforms used in the first embodiment.
Figure 7C:
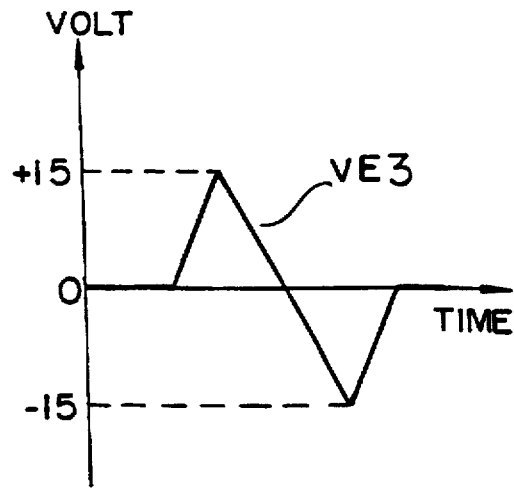

FIG. 7A is a diagram showing a waveform of the voltage applied to the piezoelectric elements 151 to 153 and illustrates when the piezoelectric elements 151 to 153 are driven during a probing operation. As shown in FIG. 7A, one cycle of the probing operation generally consists of the following periods or states: a "contact" state A in which the contact element is in contact with the workpiece; and a "seated" state B between the instance when the contact element is retracted from the workpiece and the instant when the contact element is prepared to contact with the workpiece again, i.e., a "stable" state E. In the initial stage of the "seated" state B, a period for displacing the stylus to recover the seated condition, i.e., a "moving" period C, is essentially involved. In the "moving" period C, the measurement result is not accurate even if the piezoelectric elements are actuated. Therefore, the displacement control circuit 32 activates the piezoelectric elements for a fixed period of time D after the period C has elapsed since a detecting signal output from the contact detecting circuit 32 disappeared. The voltage to be applied to the piezoelectric elements 151 to 153 is, for example, shown by VE1 in FIG. 7A and has a waveform closely similar to a sine wave, a wave height of ±15V, and a signal width of 10 ms. The square-shaped voltage VE2 shown in FIG. 7B and the triangle-shaped voltage VE3 shown in FIG. 7C are able to be used in the first and the following other embodiments.

By the application of such a voltage signal, the piezoelectric elements 151 to 153 impart expand-contract displacement to the arms 121 to 123 such that the hard balls 131 to 133 come closer to and then go away from the aperture 16 (or vise versa). Thus, the hard balls 131 to 133 are displaced in the above-described displacement allowable direction to align the direction of frictional force at each point of contact in one direction, resulting in obtaining a high return accuracy for the movable member 21 to the specified position.

More specifically, if the relative sliding between the hard balls and the V-shaped grooves is caused with a fixed procedure each time in one direction, the frictional force and a force applied on the V-shaped grooves can be always kept constant, thereby eliminating variations in the seated position of the movable member 21.

If the displacement is micro-fine, a relative movement between the hard balls and V-shaped grooves can be produced. Therefore, it is not necessary that the fixed direction to be displaced by the piezoelectric elements strictly coincides with the direction of the V-shaped grooves. Even if there is a deviation between these directions, it is possible to align the direction of frictional forces in one direction provided that such deviation is small enough to allow the relative movement between the hard balls and the V-shaped grooves to be produced.

In the first embodiment described above, the hard balls 131 to 133 are displaced relative to the three V-shaped grooves. In the present invention, it is essential to produce a relative displacement between the hard balls 131 to 133 and the V-shaped grooves 241 to 243 in a specified direction. The position orientation of the piezoelectric elements provide that the V-shaped grooves 241 to 243 may be correctly displaced relative to the three hard balls 131 to 133.

Figure 8:
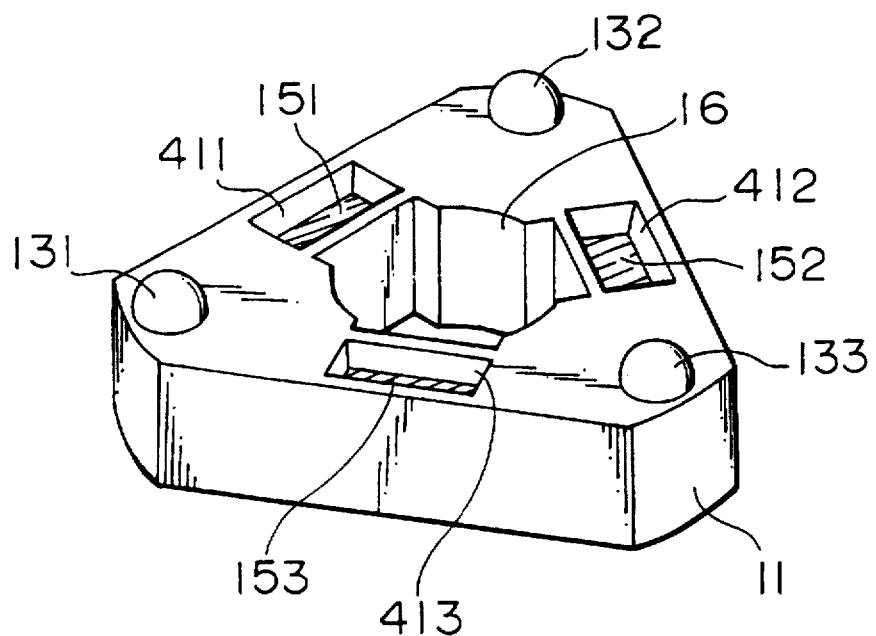
FIG. 8 is an exploded perspective view showing a second embodiment according to the present invention.

FIG. 8 illustrates a second embodiment according to the present invention. Referring to FIG. 8, receptacle through holes 411 to 413 are formed on straight lines connecting the centers of adjacent hard balls 131 to 133, and the piezoelectric elements 151 to 153 are disposed in each of the receptacle holes 411 to 413 in a preloaded condition. Although the direction of expansion and contraction of the piezoelectric elements 151 to 153 is different from the radial direction about the axis of the stylus 22, the hard balls 131 to 133 are substantially radially displaced by a resultant of the forces applied thereto. According to this embodiment, since the distance between the axis of the stylus 22 and hard balls 131 to 133 can be decreased as compared with the first embodiment shown in FIG. 5, the overall diameter of the probe apparatus can be made smaller.

Figure 9:
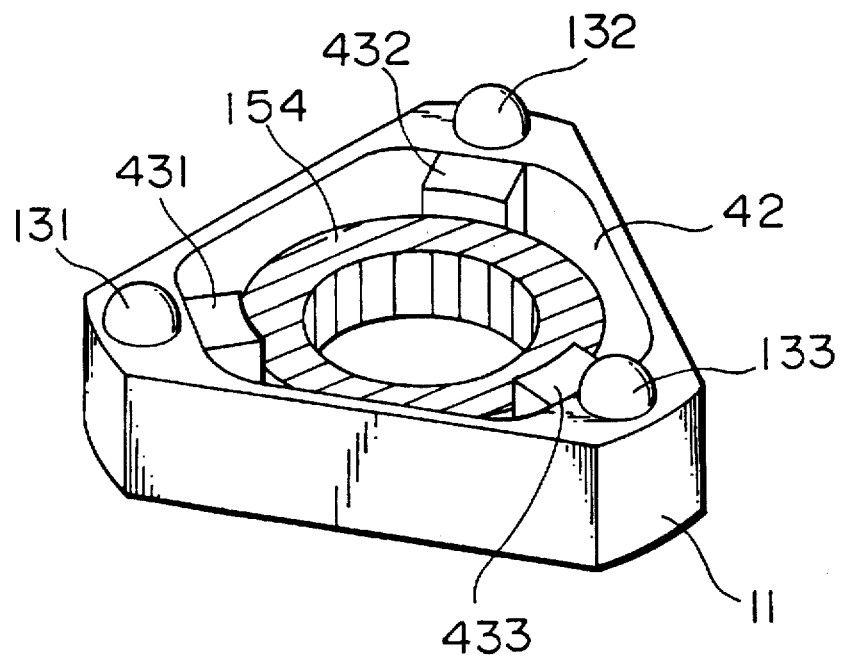
FIG. 9 is a perspective view showing a third embodiment according to the present invention.

FIG. 9 illustrates a third embodiment according to the present invention. In this embodiment, a large hexagonal through hole 42 is formed in the center of the fixed member 11, and one hollow ring-shaped piezoelectric element 154 is disposed within the through hole 42 through three pressing elements 431 to 433. In this case, the stylus 22 passes through a center hollow portion of the piezoelectric element 154. According to this embodiment, since the probe apparatus is realized by one piezoelectric element 154, the numbers of parts or components and the number of assembly steps can be reduced.

Figure 10:
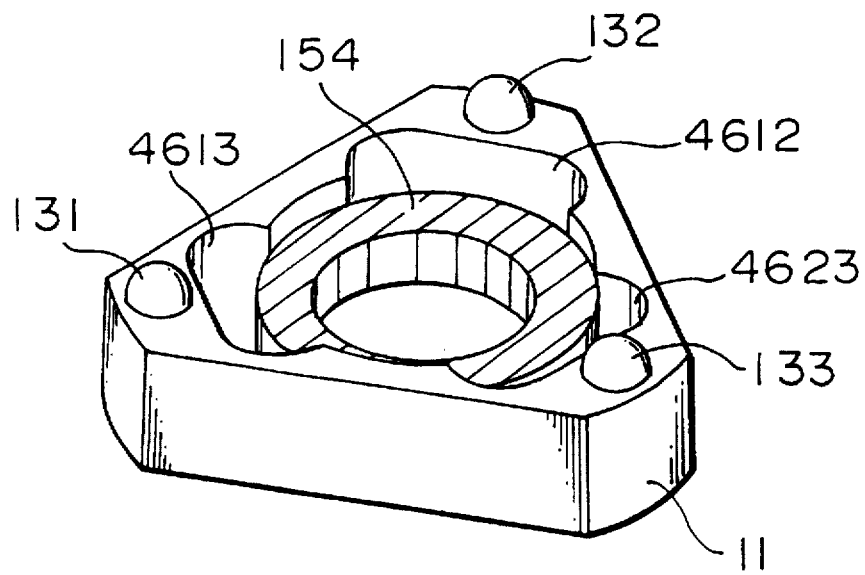
FIG. 10 is a perspective view showing a fourth embodiment according to the present invention.
Figure 11:
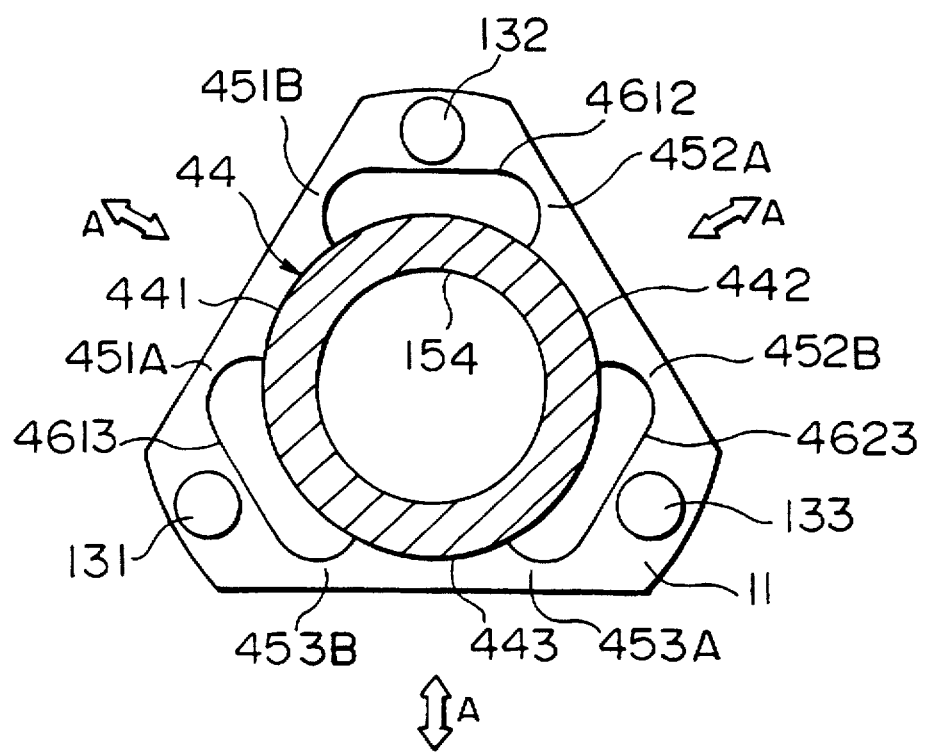
FIG. 11 is a plan view corresponding to FIG. 10.

FIGS. 10 and 11 illustrate a fourth embodiment according to the present invention. In this embodiment, the hard balls 131 to 133 are displaced by bending the fixed member 11. Referring to FIGS. 10 and 11, a through hole 44 having three contact peripheral surfaces is formed in the center of the fixed member 11, relief grooves 4613, 4612, 4623 each having thin wall portions 451A and 453B, 451B and 452A, 452B and 453A are formed at both sides of each of the contact peripheral surfaces 441 to 443, and the hollow ring-shaped piezoelectric element 154 is disposed to be brought into contact with the inner peripheral surfaces of the contacting peripheral surfaces 441 to 443. The contact peripheral surfaces 441 to 443 are formed among the hard balls 131 to 133. When the piezoelectric element 154 expands and contracts, the forces shown by arrows A in FIG. 11 act on the fixed member 11. Therefore, the hard balls 131 to 133 can be substantially radially displaced relative to the axis of the stylus 22 by actions of the thin wall portions 451A and 453B, 451B and 452A, 452B and 453A, respectively. According to this embodiment, the same effect as the third embodiment shown in FIG. 9 can be expected.

Figure 12:
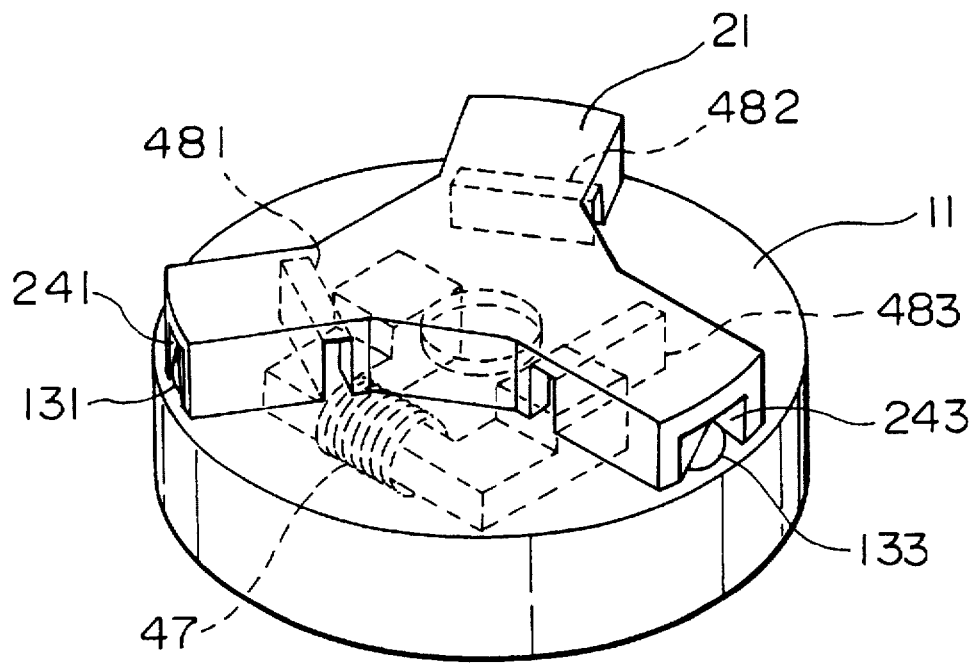
FIG. 12 is a perspective view showing a fifth embodiment according to the present invention.

FIG. 12 illustrates a fifth embodiment according to the present invention. In this embodiment, an exciting coil is employed as an actuation means, i.e., an exciting coil 47 is contained in the fixed member 11 so as to compress the center portion of the movable member 21, which is composed of a magnetic substance, with an ambient force. The V-shaped grooves 241 to 243 are formed in three portions of the movable member 21, and hinges 481 to 483 are provided inside thereof, respectively. When the center portion of the movable member 21 is compressed by the exciting coil 47, the center portion is vertically displaced. Therefore, the V-shaped grooves 241 to 243 can be substantially radially displaced relative to corresponding hard balls 131 to 133. According to this embodiment, the same effect as the third embodiment shown in FIG. 9 can also be expected.

Figure 13:
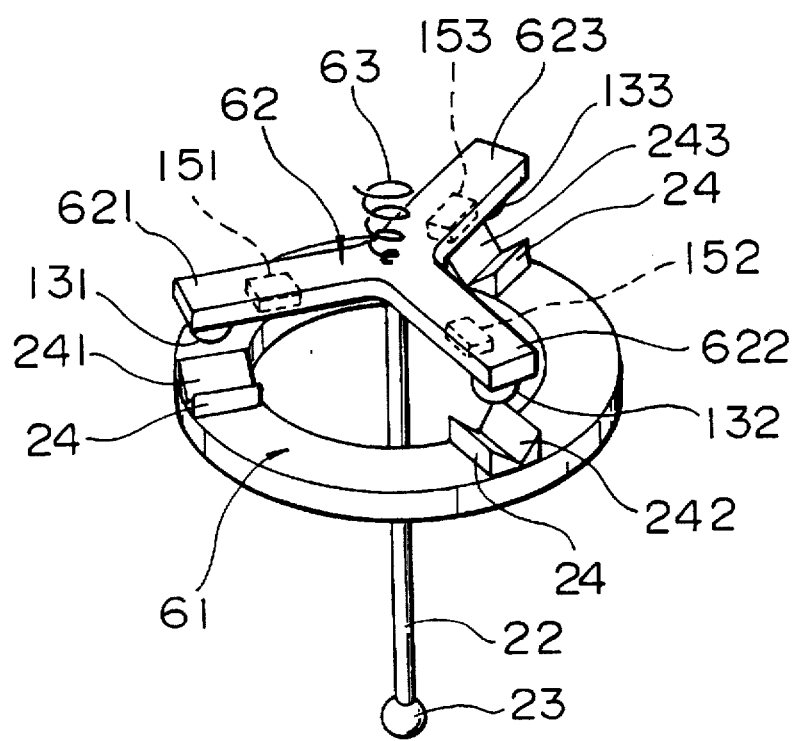
FIG. 13 is a perspective view showing a sixth embodiment according to the present invention.

A sixth embodiment of the present invention will be described with reference to FIGS. 13 to 18. The sixth embodiment differs from the first embodiment in that the V-shaped grooves 241 to 243 are formed in a fixed member 61 and the hard balls 131 to 133 are disposed on the movable member 62. Referring to FIG. 13 which illustrates the entire construction of this embodiment, the fixed member 61 consists of a ring-shaped member which is fixed to an opening end portion of a probe housing having a cylindrical shape with a bottom (not shown, and hereinafter referred to as a bottomed cylindrical probe housing), and three groove blocks 24 are spaced at 120° apart on the upper surface of the ring-shaped member. The V-shaped grooves 241 to 243 are formed in the upper portions of the groove blocks 24. A coil spring 63 is provided as a bias means which is the same as the biasing spring 7. A movable member 62 has three arms 621 to 623 radially extending at 120° spacing from the center thereof where the stylus 22 is mounted, and the hard balls 131 to 133 are disposed on the lower surfaces of the distal ends of the respective arms 621 to 623. The hard balls 131 to 133 are received in the corresponding V-shaped grooves 241 to 243 so that the position of the movable member 62 relative to the fixed member 61 is directly and exclusively determined. Each of the arms 621 to 623 have receptacle through holes (not shown), and the piezoelectric elements 151 to 153 are embedded therein in a preloaded condition. The piezoelectric elements 151 to 153 are so disposed as to expand and contract substantially along the radial direction.

Figure 14:
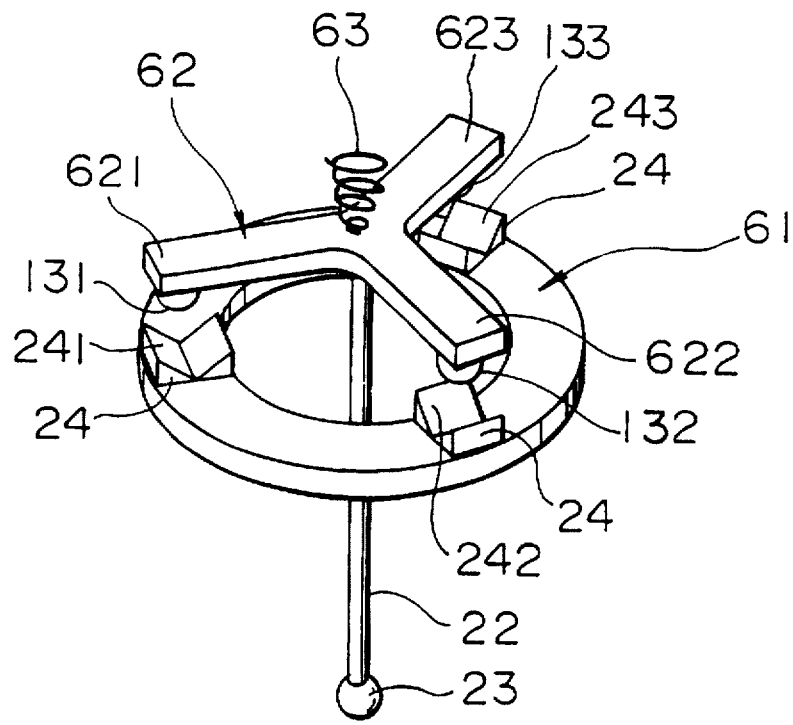
FIG. 14 is a perspective view showing a modification of the sixth embodiment shown in FIG. 13.
Figure 15:
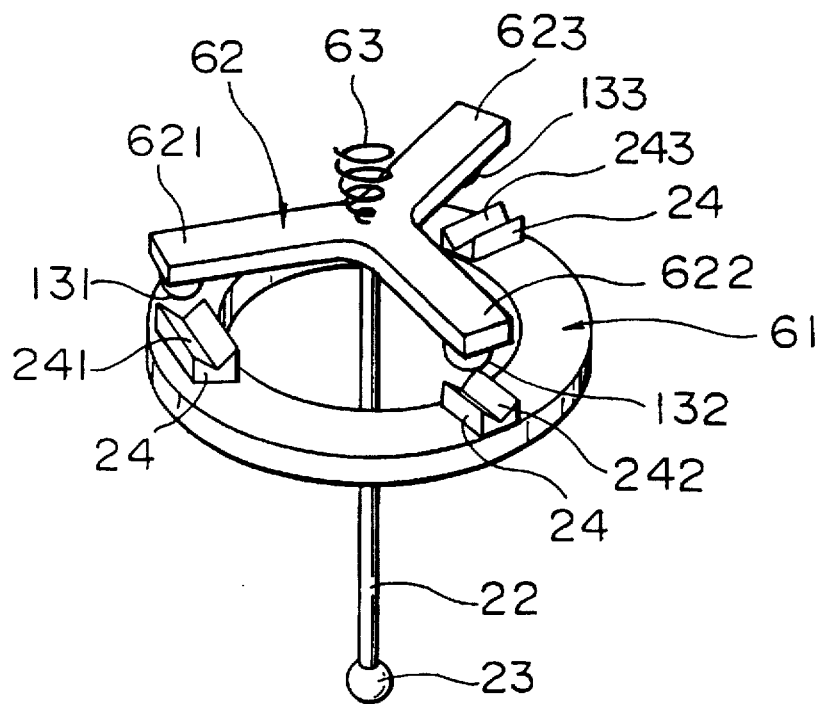
FIG. 15 is a perspective view showing another modification of the sixth embodiment shown in FIG. 13.
Figure 16:
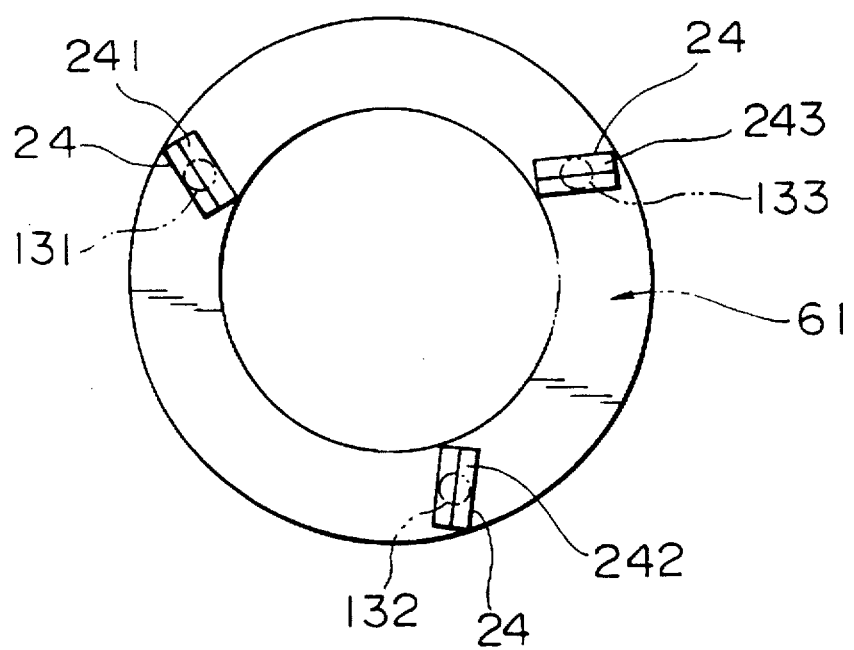
FIG. 16 is a plan view showing a main part of the modification shown in FIG. 15.

Although the axial direction (the direction in which the hard balls 131 to 133 and the V-shaped grooves 241 to 243 are relatively moved) of the V-shaped grooves 241 to 243 is substantially the radial direction about the axis of the stylus 22 in FIG. 13, the direction of the V-shaped grooves 241 to 243 is not limited thereto. For example, as shown in FIG. 14, the V-shaped grooves 241 to 243 may be oriented to a substantially circumferential direction (an angle slightly deviated from the circumferential direction), or the V-shaped grooves 241 to 243 may be oriented at random angles, as shown in FIGS. 15 and 16. In FIGS. 14 and 15, the piezoelectric elements are omitted.

Generally, a position of an object is directly and exclusively determined by three translation components and three rotational components, and a spatial position of a rigid body is determined by six restrictions. Therefore, according to the sixth embodiment, the action and effect similar to those of the first embodiment can be obtained.

Figure 17A:
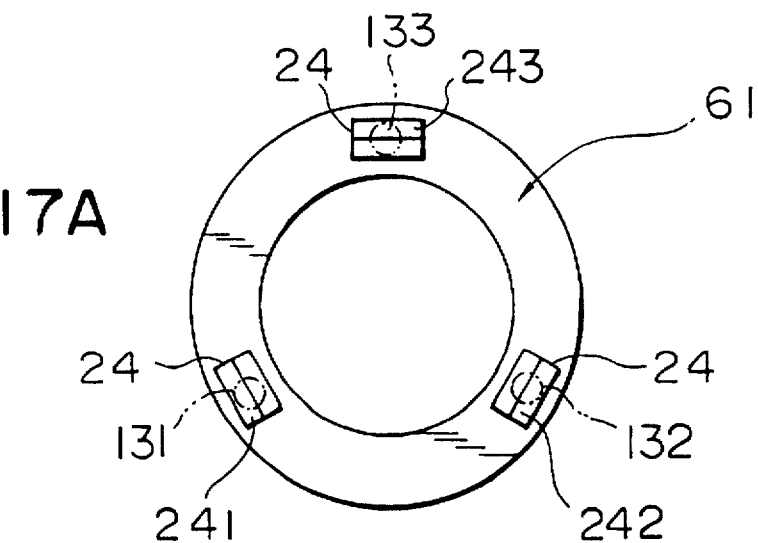
FIGS. 17A, 17B and 17C are plan views each showing improper examples of the sixth embodiment.
Figure 17B:
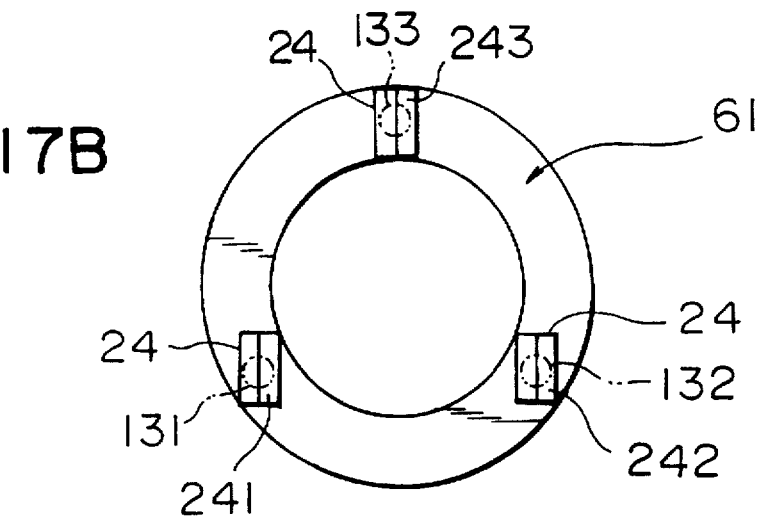
Figure 17C:
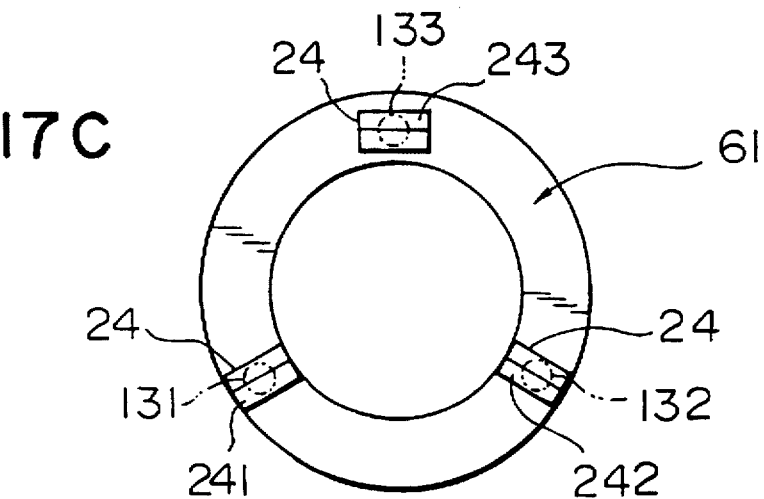

Conversely, if all the V-shaped grooves 241 to 243 are correctly oriented to the circumferential direction, as shown in FIG. 17A, if each of the V-shaped grooves 241 to 243 are oriented in the same direction, as shown in FIG. 17B, and if the V-shaped groove 243 alone is correctly oriented to the circumferential direction as shown in FIG. 17C, the object, i.e., the movable member 62, is restricted by five portions or less. Therefore, the position of the movable member 62 cannot be directly and exclusively determined.

Figure 18:
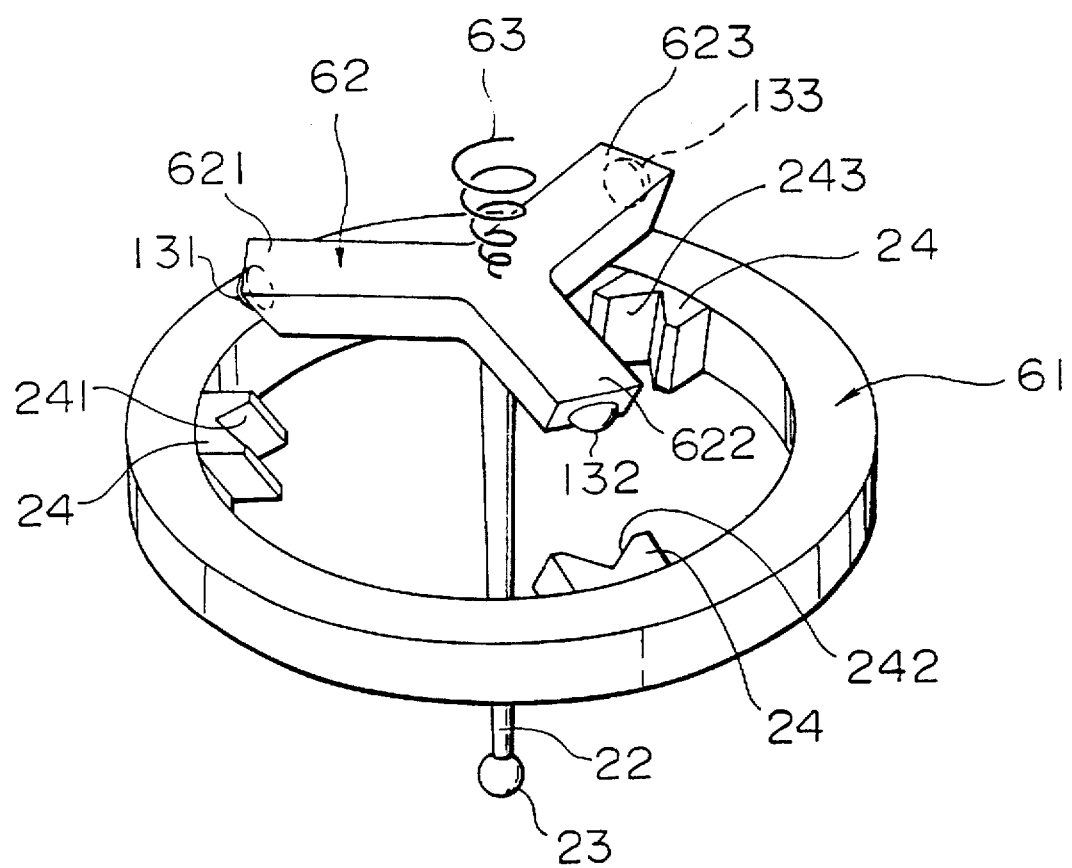
FIG. 18 is a perspective view showing a further modification of the sixth embodiment.

As shown in FIG. 18, which illustrates a modification of the sixth embodiment, the V-shaped grooves 241 to 243 may be inclined toward the axis of the stylus 22, and the hard balls 131 to 133 may be mounted to the ends of the arms 621 to 623 of the movable member 62 so that they are brought into contact with the corresponding V-shaped grooves 241 to 243. Each of the arms 621 to 623 are provided with piezoelectric elements (not shown).

A seventh embodiment of the present invention will be described with reference to FIGS. 19 and 20. The seventh embodiment differs from the sixth embodiment in the construction of convergent surfaces. The other constructions are the same as those of the sixth embodiment.

Figure 19:
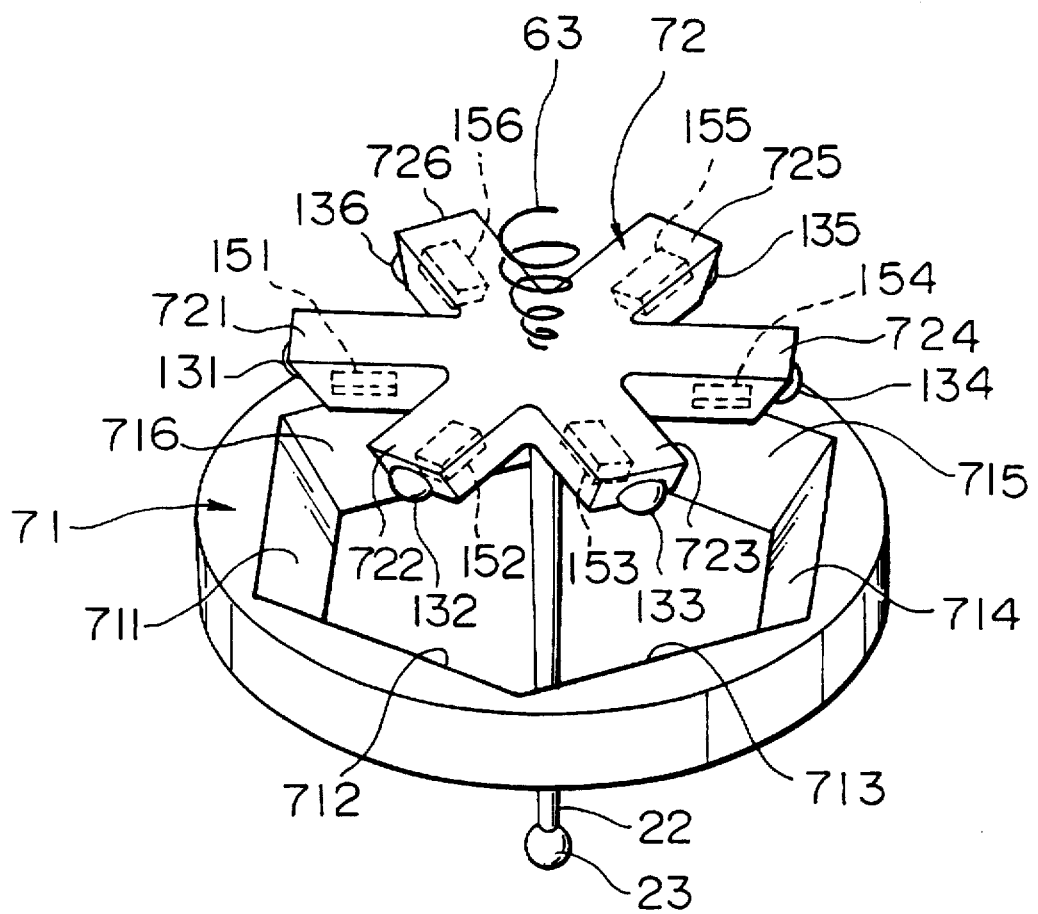
FIG. 19 is a perspective view showing a seventh embodiment according to the present invention.

Referring to FIG. 19, a fixed member 71 consists of a ring-shaped member which is fixed to an opening end portion of a bottomed cylindrical probe housing (not shown), and the inner peripheral surface of the ring-shaped member is formed into six tapered surfaces 711 to 716 which are portions of side surfaces of an imaginary hexagonal pyramid. It is assumed that the apex of the imaginary hexagonal pyramid is located on the axial line of the stylus 22. The movable member 72 has six arms 721 to 726 radially extending at 60° spacing from the center thereof where the stylus 22 is mounted, and hard balls 131 to 136 are disposed on the lower surfaces of the distal ends of the respective arms 721 to 726. The hard balls 131 to 136 come into contact with the corresponding tapered surfaces 711 to 716 so that the position of the movable member 72 relative to the fixed member 71 is directly and exclusively determined. Each of the arms 721 to 726 have receptacle through holes (not shown), and the piezoelectric elements 151 to 156 are embedded therein in a preloaded condition. The piezoelectric elements 151 to 156 are so disposed as to expand and contract substantially along the radial direction. Therefore, according to the seventh embodiment, action and effects similar to those of the sixth embodiment can be obtained.

Figure 20:
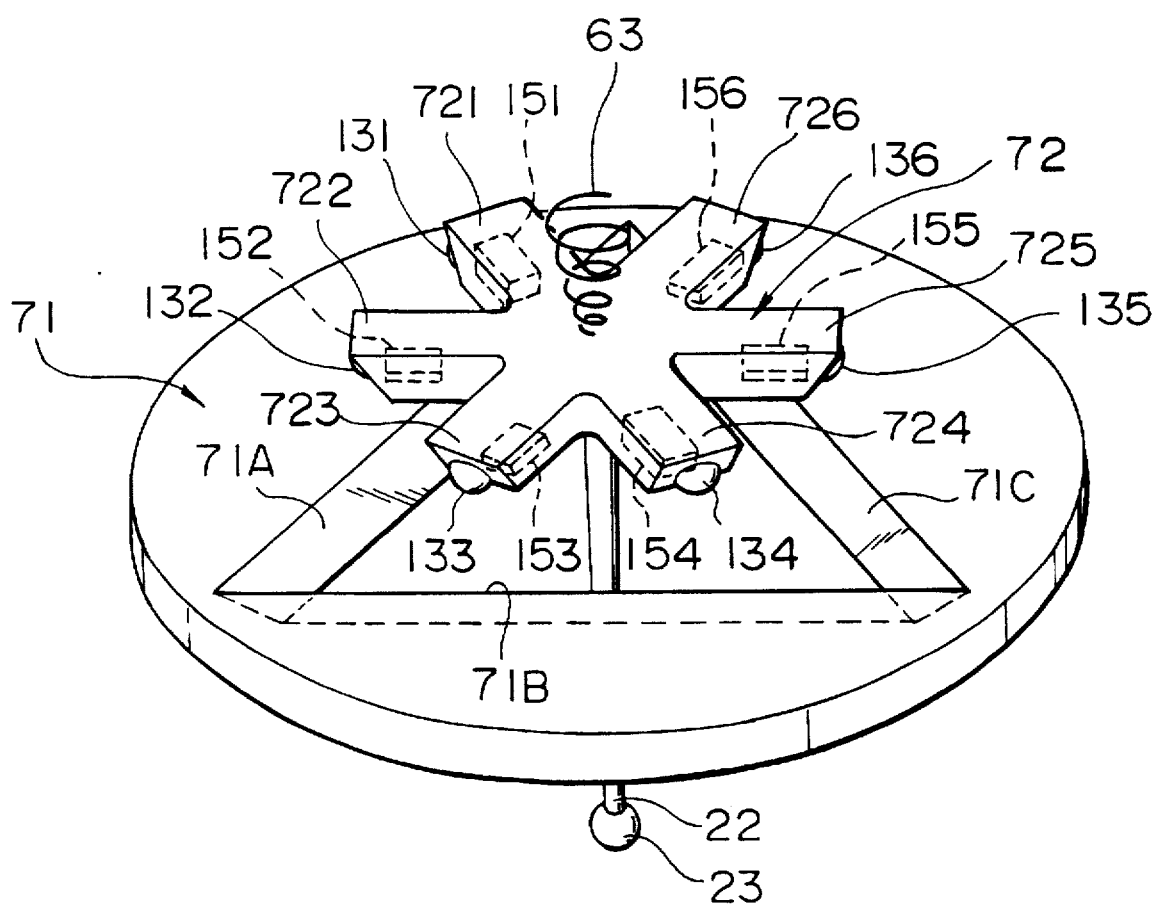
FIG. 20 is a perspective view showing a modification of the seventh embodiment shown in FIG. 19.

In the seventh embodiment, as shown in FIG. 20, the inner peripheral surface of the fixed member 71 may be formed into three tapered surfaces 71A, 71B and 71C which are portions of side surfaces of an imaginary trigonal pyramid. In this case, two hard balls 131 and 132 (133 and 134, or 135 and 136) come into contact with one tapered surface 71A (71B or 71C).

Figure 21:
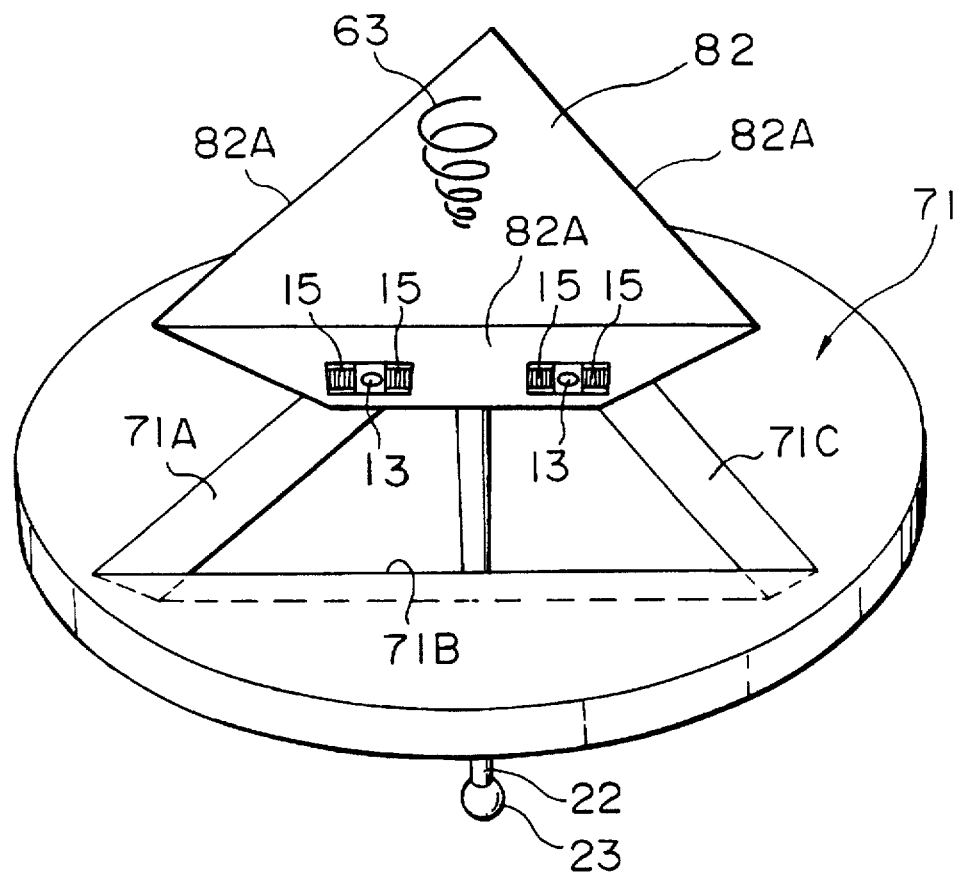
FIG. 21 is a perspective view showing an eighth embodiment according to the present invention.
Figure 22:
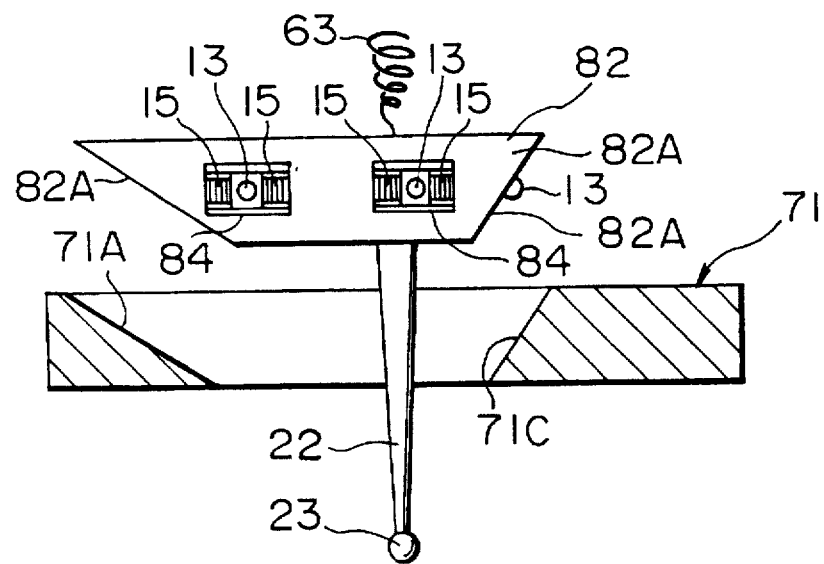
FIG. 22 is a sectional view of FIG. 21.

An eighth embodiment of the present invention will now be described with reference to FIGS. 21 to 23(A) and 23(B). The eighth embodiment differs from the seventh embodiment in the shape of the movable member and the mounting design of the piezoelectric elements. The other constructions are the same as those of embodiment. FIG. 21 is a perspective view which illustrates a major portion of the eighth embodiment, and FIG. 22 is a sectional view of FIG. 21.

Referring to these drawings, the fixed member 71 consists of a ring-shaped member which is fixed to an opening end portion of a bottomed cylindrical probe housing (not shown), and the inner peripheral surface of the ring-shaped member is formed into tapered surfaces 71A, 71B, 71C, which are portions of side surfaces of an imaginary trigonal pyramid. It is assumed that the apex of the imaginary trigonal pyramid is located on the axial line of the stylus 22. A movable member 82 is formed in the shape of a frustum of a trigonal pyramid having three tapered surfaces 82A, and the stylus 22 is mounted to the center thereof. Each of the tapered surfaces 82A have two hard balls 13, i.e., six hard balls in total. Two hard balls 13 come into contact with one tapered surface 71A (71B or 71C).

Figure 23A:
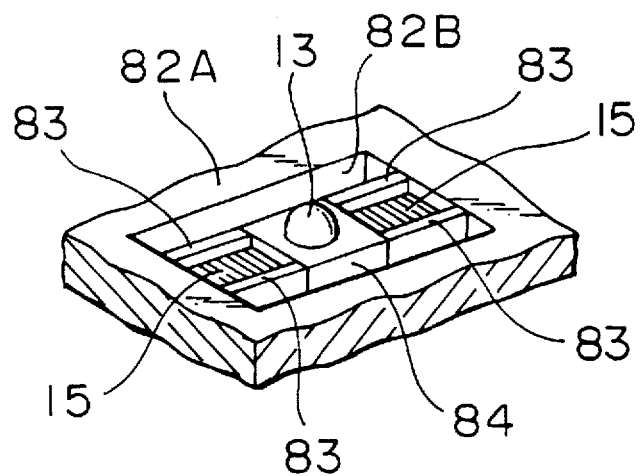
FIGS. 23(A) and 23(B) are perspective views each showing a main part of the eighth embodiment shown in FIG. 21.

FIG. 23(A) is an enlarged view of the mounting design of the hard ball 13. Referring to FIG. 23(A), a receptacle through hole 82B is formed in the tapered surface 82A of the movable member 82. Two sets of thin plates 83, i.e., four sheets in total, are disposed opposite to each other with predetermined intervals, and a block 84 in which the hard ball 13 is partially embedded is supported and fixed at the ends of the thin plates 83. A piezoelectric element 15 is placed in a space formed by the side surface of the block 84, two sheets of the thin plates 83, and the side surface of the receptacle through hole 82B. Two piezoelectric elements 15 are disposed on opposite sides of the block 84, and electrically controlled in such a manner that one of them contracts when the other one expands. When a voltage is applied on the piezoelectric elements 15, the piezoelectric elements 15 overcome the rigidity of the thin plates 83 to expand and contract so that the hard ball 13 is displaced through the block 84.

Figure 23B:
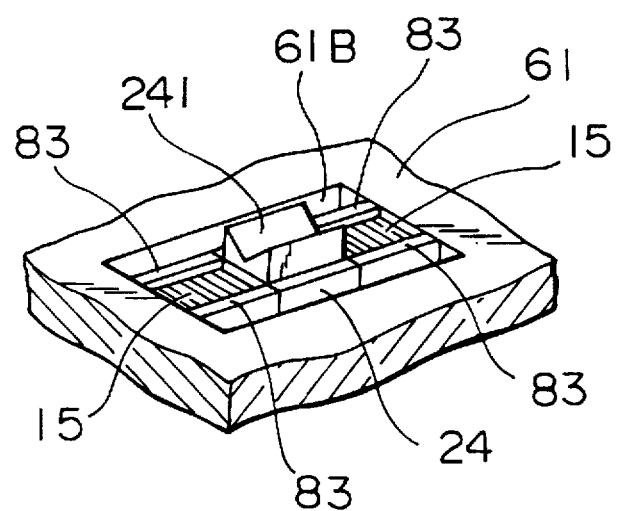

In the eighth embodiment, as shown in FIG. 23(B), the V-shaped groove 241 may be displaced by two piezoelectric elements 15 which are disposed in such a manner that they sandwich a groove block 24 of the V-shaped groove 241. More specifically, as shown in FIG. 23(B), a receptacle hole 61 is formed in a fixed member 61B, four sheets of thin plates are disposed on the side surfaces of the receptacle hole 61B, and a groove block 24 on which the V-shaped groove 241 is formed is supported and fixed at the ends of the thin plates 83. The piezoelectric element 15 is placed in a space formed by the side surface of the groove block 24, two sheets of the thin plates 83, and the side surface of the receptacle hole 61B. Two piezoelectric elements 15 are disposed on opposite sides of the groove block 24.

Figure 24:
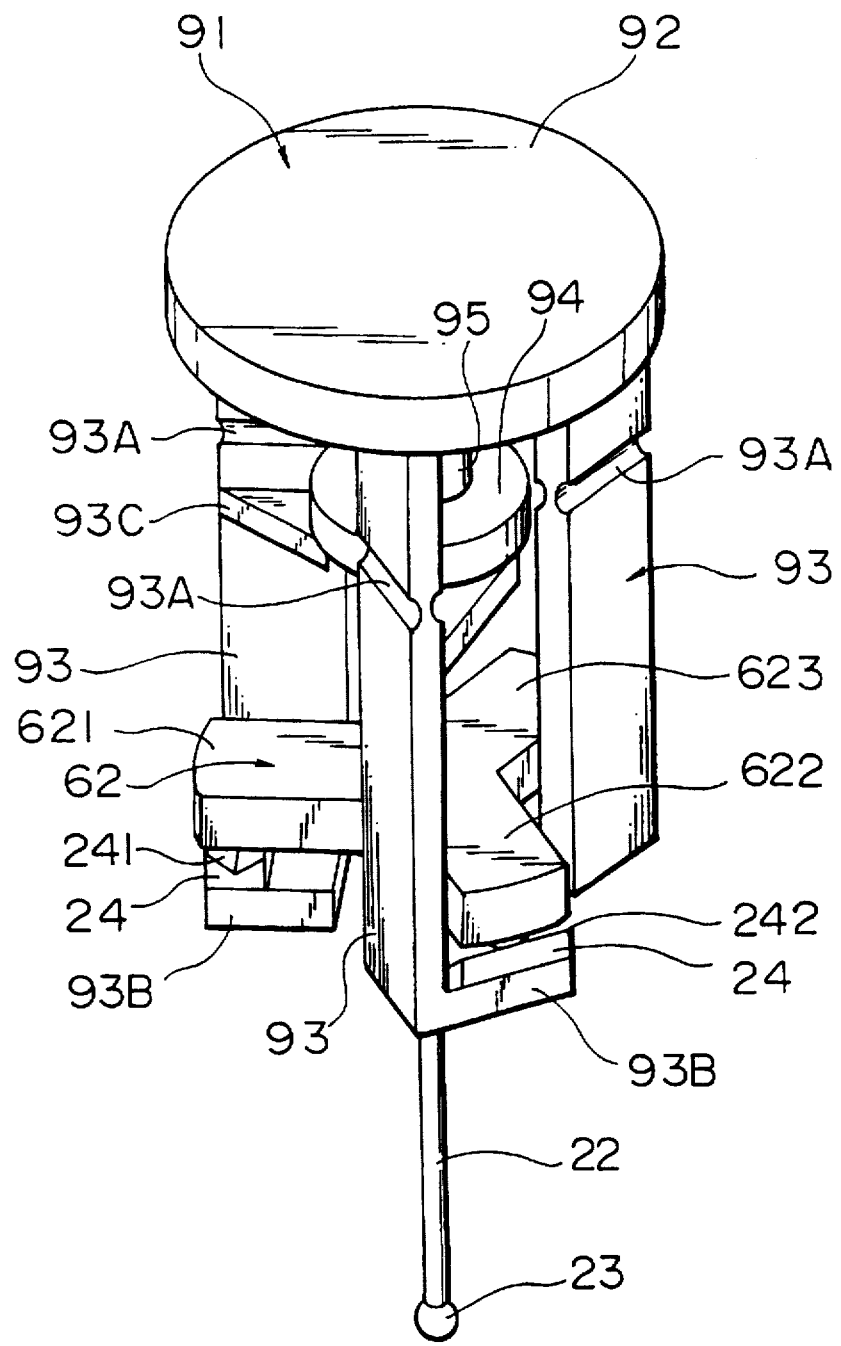
FIG. 24 is a perspective view showing a ninth embodiment according to the present invention.
Figure 25:
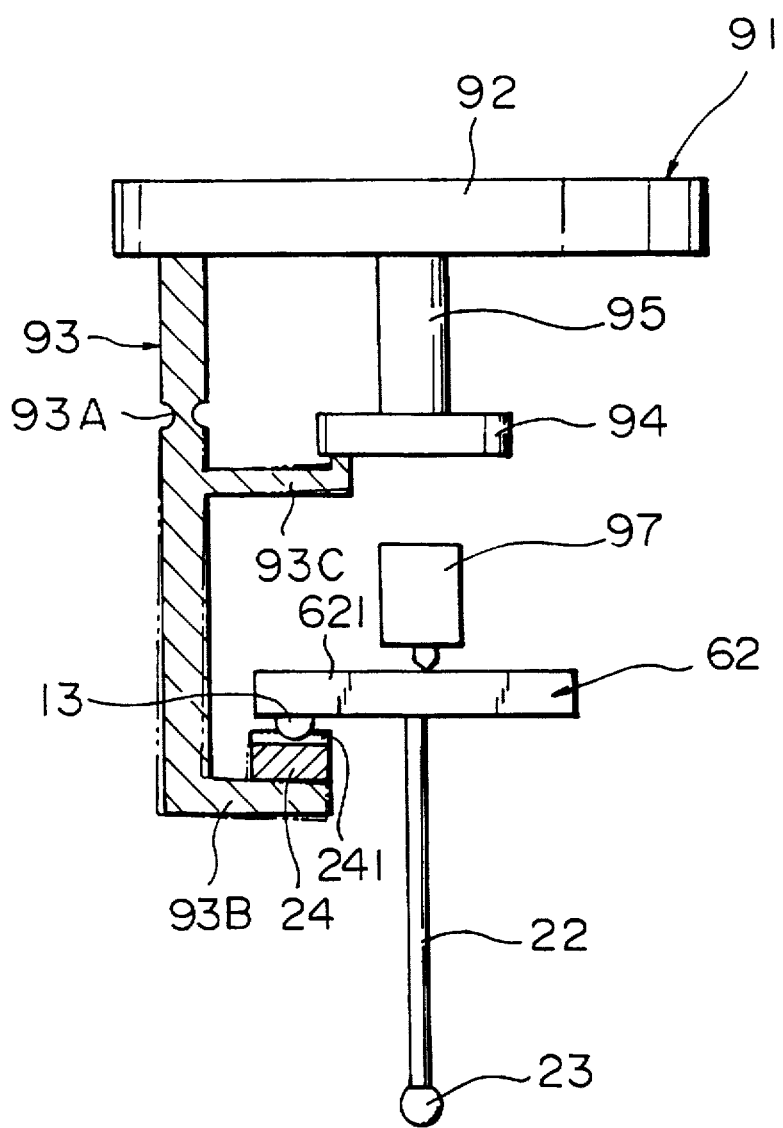
FIG. 25 is a sectional view of FIG. 24.

A ninth embodiment of the present invention will now be described with reference to FIGS. 24 and 25. The ninth embodiment differs from the sixth embodiment in the construction of the fixed member and the displacement system. The other constructions are the same as those of the sixth embodiment. Referring to FIGS. 24 and 25, a fixed member 91 includes a disc-like base 92, a plurality (e.g., three) of brackets 93 provided at lower portion of the periphery of the base 92, and groove blocks 24 provided at lower ends of each of the brackets 93. The bracket 93 is a plate member which is disposed so that the direction of the length thereof coincides with the direction of the axial line of the stylus 22, and thin-walled portion 93A serving as a hinge which permits the bracket 93 to move in the direction perpendicular to the axial line of the stylus 22 is formed in part-way of the bracket 93. Each of the brackets 93 includes first and second side plates 93B and 93C at portions lower than the thin-walled portions 93A. Groove blocks 24 are formed at the distal ends of the first side plates 93B, and V-shaped grooves 241, 242 formed in the groove blocks 24 support the hard balls provided on arms 621 to 623 of a movable member 62. A push plate 94 is supported at the distal ends of the second side plates 93C. The push plate 94 and the base 92 support and fix one actuator (displacement means) 95 therebetween. The actuator 95 is a piezoelectric element which vertically expands and contracts so as to displace three V-shaped grooves 241 simultaneously.

FIG. 25 illustrates a state in which a bias means 97 is disposed on the movable member 62. The bias means 97 may be a magnetic force generation system which displaces the movable member 62 relative to the fixed member 91 with a magnetic force, or a fluid pressure generation system which displaces the movable member 62 relative to the fixed member 91 with a fluid pressure.

According to the ninth embodiment constructed as described above, action and effects similar to those of the sixth embodiment can be obtained. In addition, since the fixed member 91 includes the base 92 and a plurality of brackets 93 which are displaceably provided to the base 92 and convergent surfaces 241 (prevented by the V-shaped grooves) are formed therein, and the displacement means expands and contracts so as to displace the convergent surfaces 241 formed between the base 92 and the bracket 93, only one actuator 95 is required to cause relative displacement between the hard balls 13 and the V-shaped grooves 241. Therefore, the structure of the apparatus can be simplified.

Figure 26:
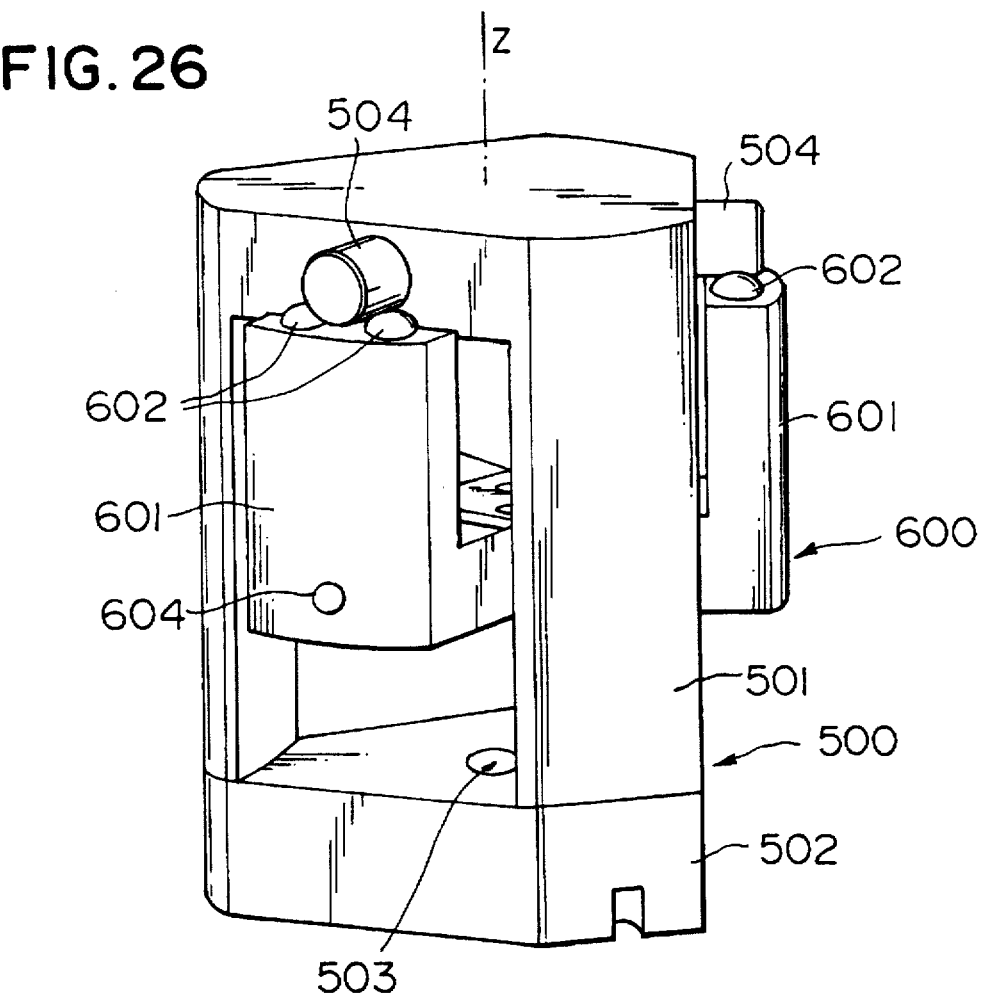
FIG. 26 is a perspective view showing a main part of a tenth embodiment according to the present invention.

A tenth embodiment of the present invention will be described with reference to FIGS. 26 and 27. FIG. 26 is a perspective view of a main part of this embodiment which illustrates a state in which a movable member 500 and a fixed member 600 are in contact with each other. The movable member 500 consists of a member 501 having a shape of a triangle table, and a member 502 fitted to the leg portion of the member 501. A stylus is fitted in a through hole 503 which is formed in the center of the member 502. Three posts 504 are embedded in upper portions of each of the side surfaces of the member 501, and the axial directions of these posts 504 form equal azimuth angles one to the other around the axis Z of the stylus. The fixed member 600 has three side plate members 601 formed at the end of the plate-like members thereof, and lower halves of two hard balls 602 are embedded in the upper end surface of each side plate member 601. The center of the fixed member 600 is disposed in the inner space of the movable member 500, and is connected to the movable member 500 by means of a spring (not shown). By a tensile force of the spring, the posts 504 of the movable member 500 come into contact with the hard balls 602 of the movable member at six points.

Figure 27:
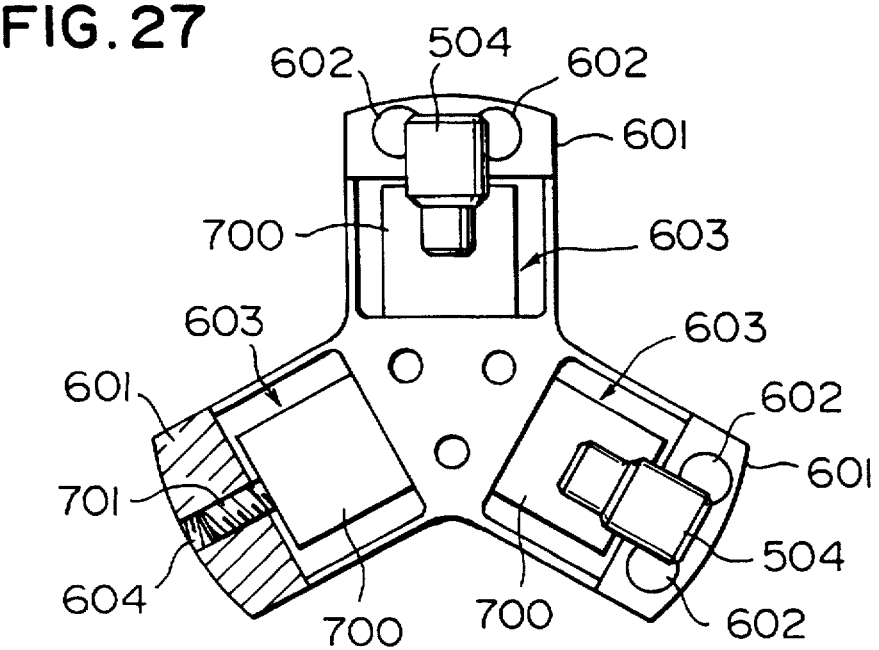
FIG. 27 is a partial plan view of the tenth embodiment according to the present invention.

FIG. 27 is a view of the fixed member 600 viewed from above which illustrates the contact of two side plate member 601 with two posts 504, and the cross section of the lower portion of the side-plate member 601. Square receptacle through holes 603 are formed, respectively, in the centers of the arms extending in three directions of the fixed member 600 and piezoelectric elements 700 are embedded therein. Threaded holes 604 which reach the receptacle through holes 603 are formed in the ends of each of three arms of the fixed member 600. By turning and adjusting screws 701 which are screwed into the threaded holes 604, the preload applied to the piezoelectric elements in the receptacle through holes can be controlled.

Figure 28:
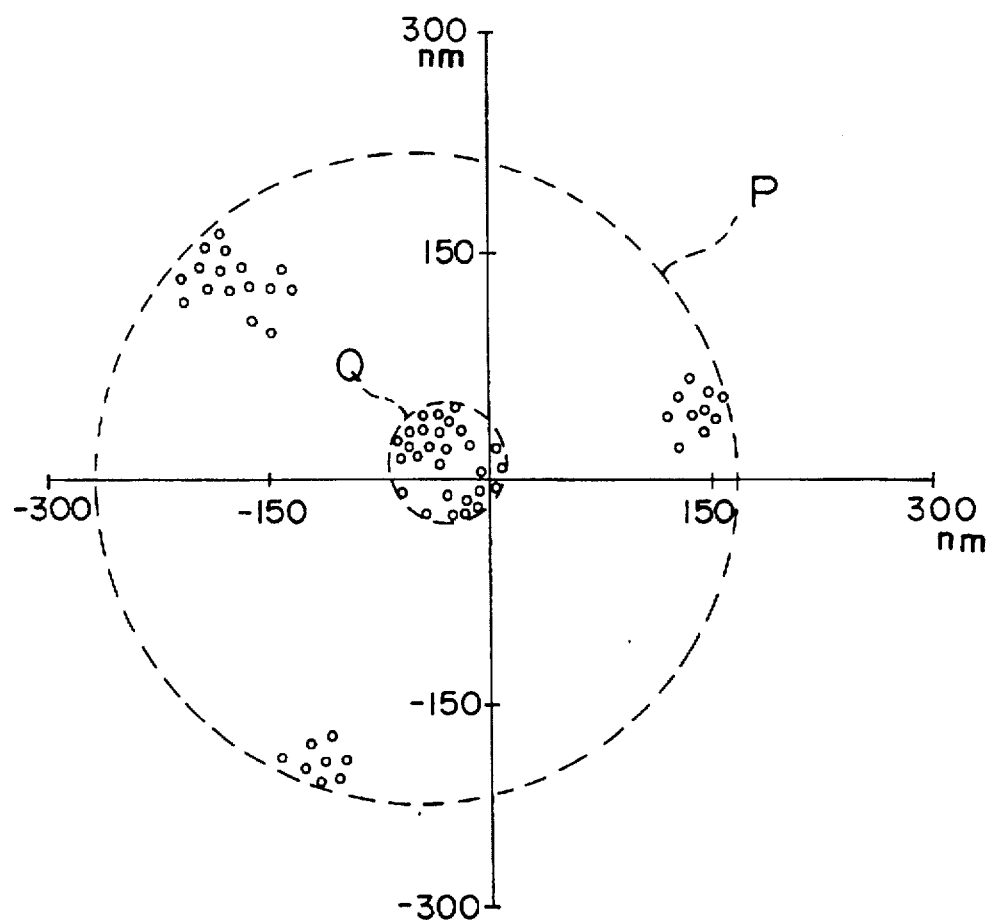
FIG. 28 is a view showing the results from the experiment conducted by actually using the apparatus of the tenth embodiment according to the present invention.

According to the tenth embodiment, action and effects similar to those of the first embodiment can be obtained. The results from the experiment conducted by actually using the apparatus of this embodiment are shown in FIG. 28. FIG. 28 shows the plane of +300 nanometers in which a probe contact element provided at the distal end of the probe is perpendicular to the axis of the probe. For this experiment purpose, a force was applied to the probe contact element at equal azimuth angles of 10° around the axis of the probe, and the positions of the probe contact element, when returned to the rest position, were measured by a special device. When the probe contact element was not displaced in its seated state, the result represented by 36 fine circles concentrated in three portions within a circle P shown by dotted lines was obtained. When the probe contact element was displaced in its seated position, the result represented by 36 fine circles concentrated within a circle Q shown by dotted lines was obtained. These results show that the touch probe of the present invention has offered a fivefold or more improvement in return accuracy.

Having thus described our invention with the detail and particularity required by the Patent Laws, what is desired protected by Letters Patent is set forth in the following claims.

What is claimed is:

1. A touch probe, comprising:

a fixed member mounted to a housing;

a movable member;

a reseat position system which permits said fixed member and said movable member to make contact with each other at a pair of contact points at each of three positions which are spaced from one another so as to determine directly and exclusively the relative position between said fixed member and said movable member;

a stylus mounted to said movable member and having a contact element at the distal end thereof which comes into contact with a workpiece;

a bias means for allowing said movable member to be displaced relative to said fixed member when a force is externally applied to said contact element and for returning said movable member to a rest position when the force applied to said contact element by the workpiece is eliminated; and a displacement system built in said fixed member or in said movable member which, when operating, causes a relative displacement between said fixed member and said movable member at each of contact points always in a fixed direction while maintaining a contacting state of said fixed member and said movable member in said reseat position system after said contact element is no longer in contact with said workpiece.

2. A touch probe according to claim 1, wherein a relative movement between said fixed member and said movable member at each pair of contact points is permitted in a specific allowable direction, and wherein the relative movement direction due to said displacement system substantially coincides with the allowable direction.

3. A touch probe according to claim 2, wherein each allowable direction at each pair of contact points of said reseat position system substantially coincides with a radial direction about the axis of said stylus.

4. A touch probe according to claim 3, wherein said displacement system includes receptacle holes formed in said fixed member or said movable member between said each pair of contact points and the axis of said stylus; and actuating elements contained in each receptacle hole, and which expand and contract substantially along said radial direction.

5. A touch probe according to claim 3, wherein said displacement system includes a through hole formed in said fixed member or said movable member within an area defined by three pairs of contact points; and a ring-shaped actuating element contained in the through hole.

6. A touch probe according to claim 4 or 5, wherein a piezoelectric element or a magnetostrictive element is used as said actuating element.

7. A touch probe according to claim 2, wherein each allowable direction at each pair of contact points of said reseat position system is slightly deviated from the perpendicular to the radial direction about the axis of said stylus.

8. A touch probe according to claim 1, wherein said bias means imparts a pressing force to the contact points of said fixed member and said movable member by means of a compressive force or a tensile force of an elastic member.

9. A touch probe, comprising:

a fixed member mounted to a housing;

a movable member;

a reseat position system which permits said fixed member and said movable member to make contact with each other at pairs of contact points at each of six positions which are spaced from one another so as to determine directly and exclusively a relative position between said fixed member and said movable member;

a stylus mounted to said movable member and having a contact element at the distal end thereof which comes into contact with a workpiece;

a bias means for allowing said movable member to be displaced relative to said fixed member when a force is externally applied to said contact element and for returning said movable member to a rest position when the force applied to said contact element by the workpiece is eliminated; and a displacement system built in said fixed member in said movable member which, when operating, causes a relative displacement between said fixed member and said movable member at each of said pairs of contact points always in a fixed direction while maintaining a contacting state of said fixed member and said movable member at six contact points in said reseat position system after said contact element is no longer in contact with said workpiece.

10. A touch probe according to claim 9, wherein a relative movement between said fixed member and said movable member at each of said pairs of contact points is permitted in a specific allowable direction, and wherein the relative movement direction due to said displacement system substantially coincides with the allowable direction.

11. A touch probe according to claim 10, wherein each allowable direction at each of contact points of said reseat position system substantially coincides with a radial direction about the axis of said stylus.

12. A touch probe according to claim 11, wherein said displacement system includes a receptacle hole formed in said fixed member or said movable member between said each of the contact points and the axis of said stylus; and an actuating element in each receptacle hole which expands and contracts substantially along said radial direction.

13. A touch probe according to claim 3, wherein said displacement system includes a through hole formed in said fixed member or said movable member within an area defined by said three pair of contact points; and a hollow ring-shaped actuating element contained in the through hole.

14. A touch probe according to claim 12 or 13, wherein a piezoelectric element or a magnetostrictive element is used as said actuating element.

15. A touch probe according to claim 9, wherein each allowable direction at six contact points of said reseat position system is substantially perpendicular to the radial direction about the axis of said stylus.

16. A touch probe according to claim 9, wherein said bias means imparts a pressing force to the contact points of said fixed member and said movable member by means of a compressive force or a tensile force of an elastic member.

17. A touch probe, comprising:

a fixed member mounted to a housing;

a movable member;

a reseat position system for permitting said fixed member and said movable member to make contact with each other at pairs of contact points such that the fixed and movable members are constrained to move along a path in a fixed direction, said pairs of contact points being spaced from one another;

a stylus mounted to said movable member and having a contact element at the distal end thereof which comes into contact with a workpiece;

a bias means for allowing said movable member to be displaced relative to said fixed member when a force is externally applied to said contact element and for returning said movable member to a rest position when the force applied to said contact element by the workpiece is eliminated; and a displacement system which, when operating, causes a relative displacement between said fixed member and said movable member at each of said pairs of contact points always in said fixed direction while maintaining a contacting state of said fixed member and said movable member in said reseat position system after said contact element is no longer in contact with said workpiece.

\* \* \* \* \*

UNITED STATES PATENT AND TRADEMARK OFFICE
CERTIFICATE OF CORRECTION

PATENT NO.  : 5,756,886
DATED       : May 26, 1998
INVENTOR(S) : Nishimura et al.

It is certified that error appears in the above-identified patent and that said Letters Patent is hereby corrected as shown below:

Column 5 Line 50 after "condition" insert period --.--.

Column 9 Line 12 "ring--shaped" should read --ring-shaped--.

Column 9 Line 47 between "the" and "embodiment" insert --the seventh--.

Column 10 Line 20 "receptacle hole 61" should read --receptacle hole 61B--.

Column 10 Line 20 "fixed member 61B" should read --fixed member 61--.

Column 10 Line 48 "grooves 241,242" should read --grooves 242--.

Column 11 Line 32 "member 601" should read --members 601--.

Column 11 Line 48 "plane of +300" should read --plane of ±300--.

Claim 9 Column 13 Line 13 after "fixed member" insert --or--.

Signed and Sealed this

Twenty-seventh Day of October, 1998

Attest:

BRUCE LEHMAN

*Attesting Officer*              *Commissioner of Patents and Trademarks*